(12) United States Patent
Fu et al.

(10) Patent No.: US 12,664,252 B2
(45) Date of Patent: Jun. 23, 2026

(54) CHALLENGE INTERFACE FOR WEB SERVICES

(71) Applicant: Roblox Corporation, San Mateo, CA (US)

(72) Inventors: Luke Fu, San Mateo, CA (US); Lirui Li, San Mateo, CA (US); Victor Reynolds, San Mateo, CA (US); Sanjay Kannan, San Mateo, CA (US); Justin Bartee, San Mateo, CA (US); Xueying Wen, San Mateo, CA (US); Shawn George, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 212 days.

(21) Appl. No.: 18/214,648

(22) Filed: Jun. 27, 2023

(65) Prior Publication Data

US 2025/0005132 A1      Jan. 2, 2025

(51) Int. Cl.
*G06F 21/44* (2013.01)
*G06F 21/45* (2013.01)

(52) U.S. Cl.
CPC ...... *G06F 21/45* (2013.01); *G06F 2221/2103* (2013.01)

(58) Field of Classification Search
CPC .......................... G06F 21/45; G06F 2221/2103
See application file for complete search history.

(56) References Cited

U.S. PATENT DOCUMENTS

| | | | | |
|---|---|---|---|---|
| 7,945,950 B2 * | 5/2011 | Nanda | .................... | G06F 21/31 726/10 |
| 9,348,981 B1 * | 5/2016 | Hearn | ................... | H04L 9/3271 |
| 9,935,953 B1 * | 4/2018 | Costigan | ............ | H04L 63/0876 |
| 10,747,857 B2 * | 8/2020 | Koch | ....................... | G06F 21/31 |
| 2011/0030040 A1 * | 2/2011 | Ronchi | .................. | G06F 21/31 726/5 |
| 2013/0205370 A1 * | 8/2013 | Kalgi | ................... | G06F 21/316 726/3 |
| 2014/0259130 A1 * | 9/2014 | Li | ........................... | G06F 21/31 726/6 |
| 2015/0180894 A1 * | 6/2015 | Sadovsky | ............ | H04W 12/12 726/22 |
| 2015/0186633 A1 * | 7/2015 | Chow | .................... | H04L 63/08 726/19 |
| 2016/0119304 A1 * | 4/2016 | Lelcuk | ................... | G06F 21/62 726/3 |

(Continued)

*Primary Examiner* — Ponnoreay Pich
(74) *Attorney, Agent, or Firm* — IP Spring

(57) ABSTRACT

The application describes a no coding integration approach for any web service by using a challenge interface as a middleware intermediate between a public application programming interface (API) and a challenge service so that any changes made in challenge protocols are implemented at the challenge interface. The challenge interface includes a rule engine that dynamically executes rules and evaluates suspicious signals from requests to automatically decide how many challenges and what kind of challenges are needed to satisfy a current request. The user interface provided to the user device automatically updates for different challenge types through an interceptor approach. The user interface works for all supported device types, including browsers, mobile devices, and native applications.

20 Claims, 7 Drawing Sheets

(56)     References Cited

U.S. PATENT DOCUMENTS

| | | | |
|---|---|---|---|
| 2017/0061441 A1* | 3/2017 | Kamal | G06Q 20/326 |
| 2020/0201981 A1* | 6/2020 | Wardman | G06F 21/44 |
| 2022/0215384 A1* | 7/2022 | Livingston | G06Q 20/3829 |
| 2023/0098536 A1* | 3/2023 | Zheng | G06F 21/6209 |
| | | | 726/19 |
| 2023/0137832 A1* | 5/2023 | Paffel | G16H 80/00 |
| | | | 705/3 |
| 2024/0012889 A1* | 1/2024 | Park | G06F 21/31 |
| 2024/0340312 A1* | 10/2024 | Radon | H04L 63/1483 |
| 2025/0005132 A1* | 1/2025 | Fu | G06F 21/45 |

* cited by examiner

700

Receive, from a user device, a first request to perform an action
702

Transmit, from a challenge interface to a challenge service, a
second request for a challenge token 704

Receive, with the challenge interface from the challenge service,
a type of challenge based on a type of action that is part of the
first request 706

Present the type of challenge, with the challenge interface, to the
user device 708

Responsive to verifying that the user device solved the type of
challenge, receive a challenge token from the challenge service
710

Provide the challenge token to the user device 712

FIG 7

CHALLENGE INTERFACE FOR WEB SERVICES

BACKGROUND

Some online platforms (e.g., gaming platforms, media exchange platforms, etc.), allow users to connect with each other, interact with each other (e.g., within a game), create games, and share information with each other via the Internet. Users of online platforms may participate in multiplayer gaming environments or virtual environments (e.g., three-dimensional environments), design custom gaming environments, design characters and avatars, decorate avatars, exchange virtual items/objecneets with other users, communicate with other users using audio or text messaging, and so forth. Environments such as metaverse or multiverse environments can also enable users that participate to share, sell, or trade objects of their creation with other users.

Online multiplayer games typically depend on network communication between user device devices and a central server. The central server can prevent bad actors from infiltrating the central server by presenting challenges to users that increase the cost or difficulty of performing high-risk activity. The challenges may include two-step verification during login to prevent an account from being compromised from credential stuffing (also known as compromise from password leaks) and using captchas during signup to increase the cost of bot account creation.

As infiltration attempts become more sophisticated, the types of challenges may be updated to respond to new types of attacks. However, updating the system to include new types of challenge can take weeks to implement. For example, modifying a challenge to include a requirement to re-enter a password before a creator revokes the ability to purchase an item requires manually changing the Application Programming Interface (API) and shipping the changes to every user device that supports the feature. As a result, the central server may be vulnerable during the time it takes to modify the challenge.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The application advantageously describes a no coding integration approach for any web service by using a challenge interface as a middleware intermediate between a public API and a challenge service so that any changes made in challenge protocols are implemented at the challenge interface, thereby avoiding relatively long delays to take weeks to make changes to the public API. The challenge interface includes a rule engine that dynamically executes rules and evaluates suspicious signals from requests to automatically decide how many challenges and what kinds of challenges are needed to satisfy a current request. The user interface provided to the user device automatically updates for different challenge types through an interceptor approach. The user interface works for all supported device types, including browsers, mobile devices, and native applications.

A computer-implemented method includes receiving, from a user device, a first request to perform an action. The method further includes transmitting, from a challenge interface to a challenge service, a second request for a challenge token. The method further includes receiving, with the challenge interface from the challenge service, a type of challenge based on a type of action that is part of the first request. The method further includes presenting the type of challenge, with the challenge interface, to the user device. The method further includes responsive to verifying that the user device solved the type of challenge, receiving a challenge token from the challenge service. The method further includes providing the challenge token to the user device.

In some embodiments, the method further includes receiving a change to a protocol associated with the challenge and implementing, with the challenge interface, the change to the type of challenge. In some embodiments, the method further includes before receiving the first request to perform the action, receiving a login request from the user device and determining, with the challenge service based on the type of action being the login request, that a login challenge response is needed for authentication, where an authenticator application programming interface (API) acts as an intermediate between the user device and the challenge service to facilitate authentication of the login request. In some embodiments, verifying that the user device solved the challenge includes determining whether the first request is suspicious based on information associated with the first request. In some embodiments, the information associated with the first request is input to a machine-learning model that outputs a determination of suspicion. In some embodiments, verifying that the user device solved the challenge includes determining whether to apply rate limiting that introduces a time delay in between authentication attempts. In some embodiments, the type of challenge includes at least one challenge selected from the group of captcha, two-step verification, reauthentication, security questions, proof of work, force authenticator, and combinations thereof.

According to one aspect, a system includes a processor and a memory coupled to the processor, with instructions stored thereon that, when executed by the processor, cause the processor to perform operations comprising: receiving, from a user device, a first request to perform an action; transmitting, from a challenge interface to a challenge service, a second request for a challenge token; receiving, with the challenge interface from the challenge service, a first type of challenge based on a type of action that is part of the first request; presenting the first type of challenge, with the challenge interface, to the user device; responsive to verifying that the user device solved the first type of challenge, presenting a second type of challenge, with the challenge interface, to the user device; responsive to verifying that the user device solved the second type of challenge, receiving a challenge token from the challenge service; and providing the challenge token to the user device.

In some embodiments, the operations further include receiving a change to a protocol associated with the challenge and implementing, with the challenge interface, the change to the type of challenge. In some embodiments, the system further includes an authenticator API and the operations further include: before receiving the first request to perform the action, receiving a login request from the user device, determining, with the challenge service based on the type of action being the login request, that a login challenge response is needed for authentication, and authenticating, with the authenticator API, the login request. In some embodiments, verifying that the user device solved the challenge includes determining whether the first request is suspicious based on information associated with the first request. In some embodiments, the information associated with the first request is input to a machine-learning model that outputs a determination of suspicion. In some embodiments, verifying that the user device solved the challenge includes determining whether to apply rate limiting that introduces a time delay in between authentication attempts. In some embodiments, the type of challenge includes at least one challenge selected from the group of captcha, two-step verification, reauthentication, security questions, proof of work, force authenticator, and combinations thereof.

According to one aspect, a non-transitory computer-readable medium with instructions stored thereon that, when executed by one or more computers, cause the one or more computers to perform operations, the operations including: receiving, from a user device, a first request to perform an action, transmitting, from a challenge interface to a challenge service, a second request for a challenge token, receiving, with the challenge interface from the challenge service, a type of challenge based on a type of action that is part of the first request, presenting the type of challenge, with the challenge interface, to the user device, responsive to verifying that the user device solved the type of challenge, receiving a challenge token from the challenge service, and providing the challenge token to the user device.

In some embodiments, the operations further include receiving a change to a protocol associated with the challenge and implementing, with the challenge interface, the change to the type of challenge. In some embodiments, the operations further include before receiving the first request to perform the action, receiving a login request from the user device and determining, with the challenge service based on the type of action being the login request, that a login challenge response is needed for authentication, where an authenticator application programming interface (API) acts as an intermediate between the user device and the challenge service to facilitate authentication of the login request. In some embodiments, verifying that the user device solved the challenge includes determining whether the first request is suspicious based on information associated with the first request. In some embodiments, the information associated with the first request is input to a machine-learning model that outputs a determination of suspicion. In some embodiments, verifying that the user device solved the challenge includes determining whether to apply rate limiting that introduces a time delay in between authentication attempts.

BRIEF DESCRIPTION OF THE DRAWINGS

FIG. 7 is a flow diagram of an example method to use a challenge interface to verify a challenge, according to some embodiments described herein.

DETAILED DESCRIPTION

Network Environment 100

Figure 1:
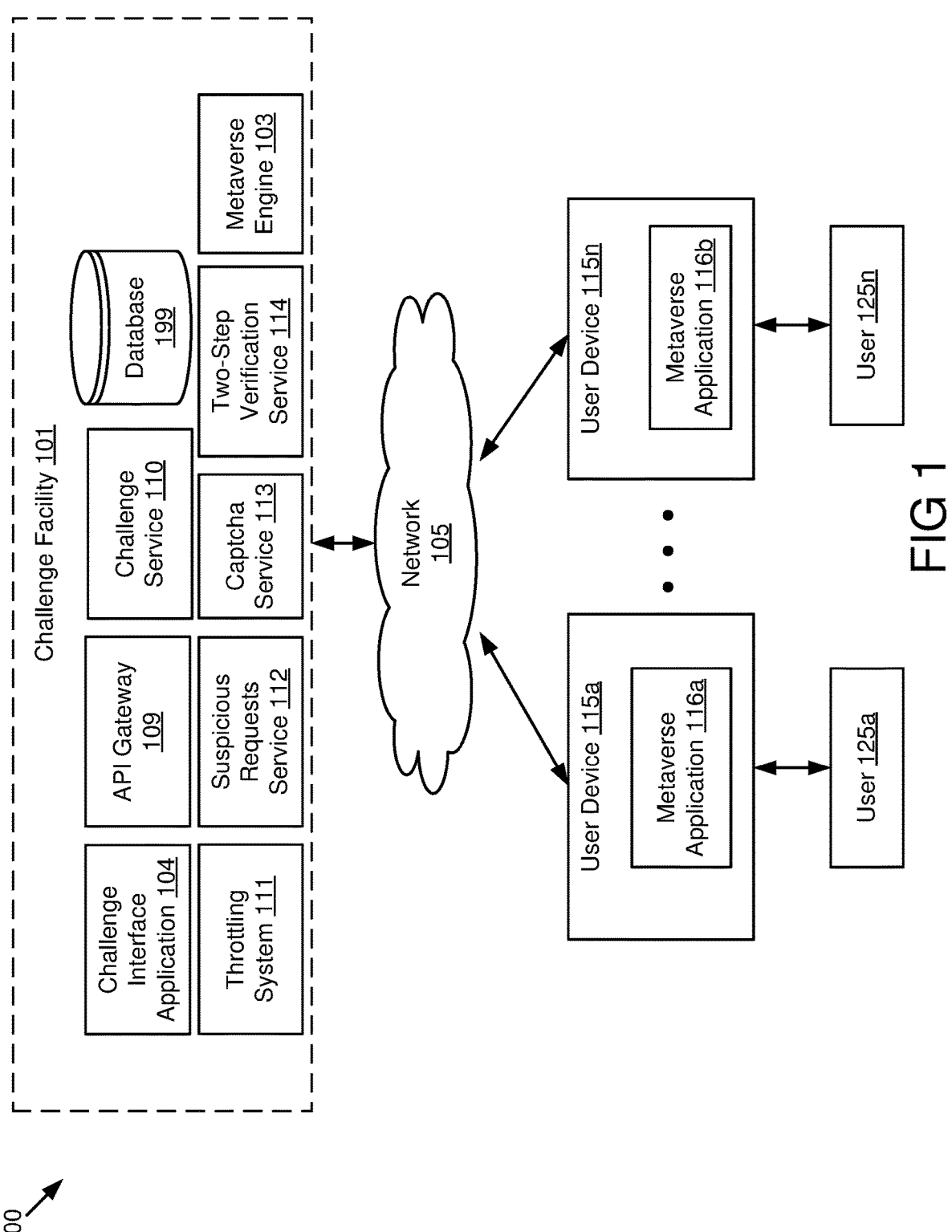
FIG. 1 is a block diagram of an example network environment to use a challenge interface to verify challenges, according to some embodiments described herein.

FIG. 1 is a block diagram of an example network environment 100 to use a challenge interface to verify challenges. In some embodiments, the environment 100 includes a challenge facility 101, user devices 115a . . . n, and a network 105. Users 125a . . . n may be associated with the respective user devices 115a . . . n. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number. In some embodiments, the environment 100 may include other servers or devices not shown in FIG. 1.

The challenge facility 101 provides a variety of services that are used to ensure against threats to a central server. The entities of the challenge facility 101 include a challenge interface application 104, an authentication Application Programming Interface (API) gateway 109, a challenge service 110, a throttling system 111, a suspicious requests service 112, a captcha service 113, a two-step verification service 114, a metaverse engine 103, and a database 199. Each of the entities illustrated in the challenge facility 101 may be stored on a separate server or one or more of the entities may be stored on the same server.

The challenge interface application 104 includes codes and routines operable to serve as the interface between the user devices 115 and the different entities that perform various authentication and challenge steps. For example, instead of the API gateway 109 directly communicating with a user device 115 and a challenge service 110, the challenge interface application 104 functions as an intermediate.

In some embodiments, the API gateway 109 performs routing of API requests. The API gateway 109 receives API requests from the user device 115, manages API requests, API version management, security policies, etc. In some embodiments, the API gateway 109 manages authentication of a user device 115 based on a particular authentication protocol, such as Auth0. For example, the user device 115 may provide a username or email and password that the API gateway 109 uses for validating a user 125 log-in. The API gateway 109 may then provide challenge parameters to the challenge service 110 in order to receive a challenge session ID from the challenge service 110. The API gateway 109 may inform the user device 115 that a challenge is needed (e.g., the challenge is required by a particular protocol) s and the user device 115 may use the challenge session ID with the challenge interface application 104 described below in order to initiate a challenge.

The challenge service 110 determines types of challenges that are needed, issues challenge session identifiers (IDs), authenticates the challenges, and after verifying the challenges, issues challenge tokens. The challenge service 110 communicates with the challenge interface application 104 instead of directly communicating with the user devices 115 in order to make the process of changing challenge requirements more seamless.

In some embodiments, the challenge service 110 also manages communications between the throttling system 111, the suspicious requests service 112, the captcha service 113, and the two-step verification service 114. When each of these services is used, the challenge service 110 may request information from each of the services and then use the information to manage requests from user devices 115, for example, by enforcing rate limiting, implementing a captcha requirement, etc.

The throttling system 111 may determine whether the challenge service 110 should provide rate limiting based on information about the user device 115 and a request provided by the user device 115. For example, rate limiting may be used to control the rate of requests sent or received to prevent Denial of Service (DOS) attacks and limit web scraping. In some embodiments, the throttling system 111 determines whether to provide rate limiting based on an IP address and/or a user ID associated with a request from the user device 115 and determines that rate limiting is automatically enforced based on a number of requests per second from the user device 115.

In some embodiments, the throttling system 111 includes a floodchecker service that helps implement rules about when to implement rate limiting. For example, flooding rates for one compromised computing device may be in excess of 20 HyperText Transfer Protocol (HTTP) GET requests per second and if the throttling system 111 suspects that requests are coming from a compromised computing device, the throttling system 111 may limit the rate of requests to avoid this situation. In some embodiments, the throttling system 111 determines whether to use the floodchecker service when the decision whether to limit the rate of requests is identified by features specific to a business logic operation (e.g., the ID of an asset type) or when the decision whether to limit the rate is based on certain circumstances (e.g., account cooldown, where attempts to login on an account with no email are blocked).

The suspicious requests service 112 determines whether a request is suspicious based on information about the user device 115, the request, a pattern of requests received from the user device 115, etc. The suspicious requests service 112 may determine whether the request is suspicious based on geographic information, a time of day, an IP address, and/or a user ID. In some embodiments, if the suspicious requests service 112 determines that the request is suspicious, the suspicious requests service 112 instructs the challenge service 110 to perform additional steps, such as to ask for additional authentication, block a user device 115 associated with the request, add the IP address associated with the user device 115 to a list of suspicious IP addresses, etc.

In some embodiments, the suspicious requests service 112 uses a trained machine-learning model to determine whether a request is suspicious. For example, the machine-learning model may be trained using a dataset of metadata associated with requests and determinations of whether the requests are suspicious requests. The trained machine-learning model receives information about a request as input and outputs a determination of suspicion. The information about the request may include geographic information, a time of day, an IP address, a user ID, etc.

The captcha service 113 generates information for implementing a captcha challenge, such as the images and the solution to a captcha challenge. In some embodiments, the captcha service 113 provides the information for implementing the captcha challenge to the challenge service 110.

The two-step verification service 114 generates information for implementing a two-step verification challenge. For example, the two-step verification service 114 may use a phone number associated with the user device 115 to send a Short Message Service (SMS) to the user 125 with an authentication code and send the same authentication code to the challenge service 110 for confirmation. The authentication code may be used in addition to a typical authentication process involving a username and password.

In another example, the two-step verification service 114 may generate a One-Time Password (OTP) that is used in addition to a username and password for authentication. In yet another example, the two-step verification service 114 may use a FIDO Universal 2nd Factor (FIDO U2F) authentication standard that uses a specialized Universal Serial Bus (USB) or Near-Field Communication (NFC) security key based on public key cryptography. In this example, the user 125 may obtain access to the virtual environment by providing a username and password as well as providing the USB or NFC security key to the challenge service 110 for authentication.

In some embodiments, after a two-step verification challenge is successful, the two-step verification service 114 handles a request from the user device 115 to not ask for two-step verification on the user device 115 for a certain number of days (e.g., 30 days). In some embodiments, the two-step verification service 114 generates a cookie that is provided to the user device 115 that the user device 115 then provides against a session tracked with the two-step verification service 114 so that the user device 115 does not have to perform two-step verification until the cookie expires.

In some embodiments, the metaverse engine 103 includes code and routines operable to receive communications between two or more users in a virtual environment, for example, at a same location in the metaverse, within a same metaverse experience, or between friends within a metaverse application 116. The users interact within the metaverse across different demographics (e.g., different ages, regions, languages, etc.).

In some embodiments, the metaverse engine 103 is implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

In some embodiments, the challenge interface application 104 receives, from a user device 115, a request to perform an action. The challenge interface application 104 transmits a request for a challenge token to the challenge service 110.

The challenge interface application 104 receives a challenge from the challenge service 110 that is based on a type of action that is part of the request to perform an action. The challenge interface application 104 presents the challenge to the user device 115. Responsive to verifying that the user device 115 solved the challenge, the challenge interface application 104 provides the challenge token to the user device 115, which the user device 115 subsequently uses to perform the action. For example, the user device 115 may use the challenge token to access a virtual environment generated by the metaverse engine 103 or to perform a particular action within a virtual experience.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the challenge facility 101, such as user IDs, challenge session IDs, challenge tokens, etc.

The user device 115 may be a computing device that includes a memory and a hardware processor. For example, the user device 115 may include a mobile device, a tablet computer, a desktop computer, a mobile telephone, a wearable device, a head-mounted display, a mobile email device, a portable game player, a portable music player, or another electronic device capable of accessing a network 105.

User device 115a includes metaverse application 116a and user device 115n includes metaverse application 116n, respectively. In some embodiments, the user device 115 stores a unified library or includes a browser that displays a webpage with a single interface generated by the challenge interface application 104 that is used to solve different challenges. Once the user device 115 successfully passes one or more challenges, the user device 115 receives a challenge token from the challenge interface application 104 that the user device 115 provides for performing actions in a virtual experience. In some embodiments, the metaverse application 116 on a user device 115 receives a virtual experience from the metaverse engine 103 from the challenge facility 101. The metaverse application 116 generates a user interface that displays the virtual experience to the user 125.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the challenge facility 101 and the user devices 115, in practice one or more networks 105 may be coupled to these entities.

Computing Device Example 200

Figure 2:
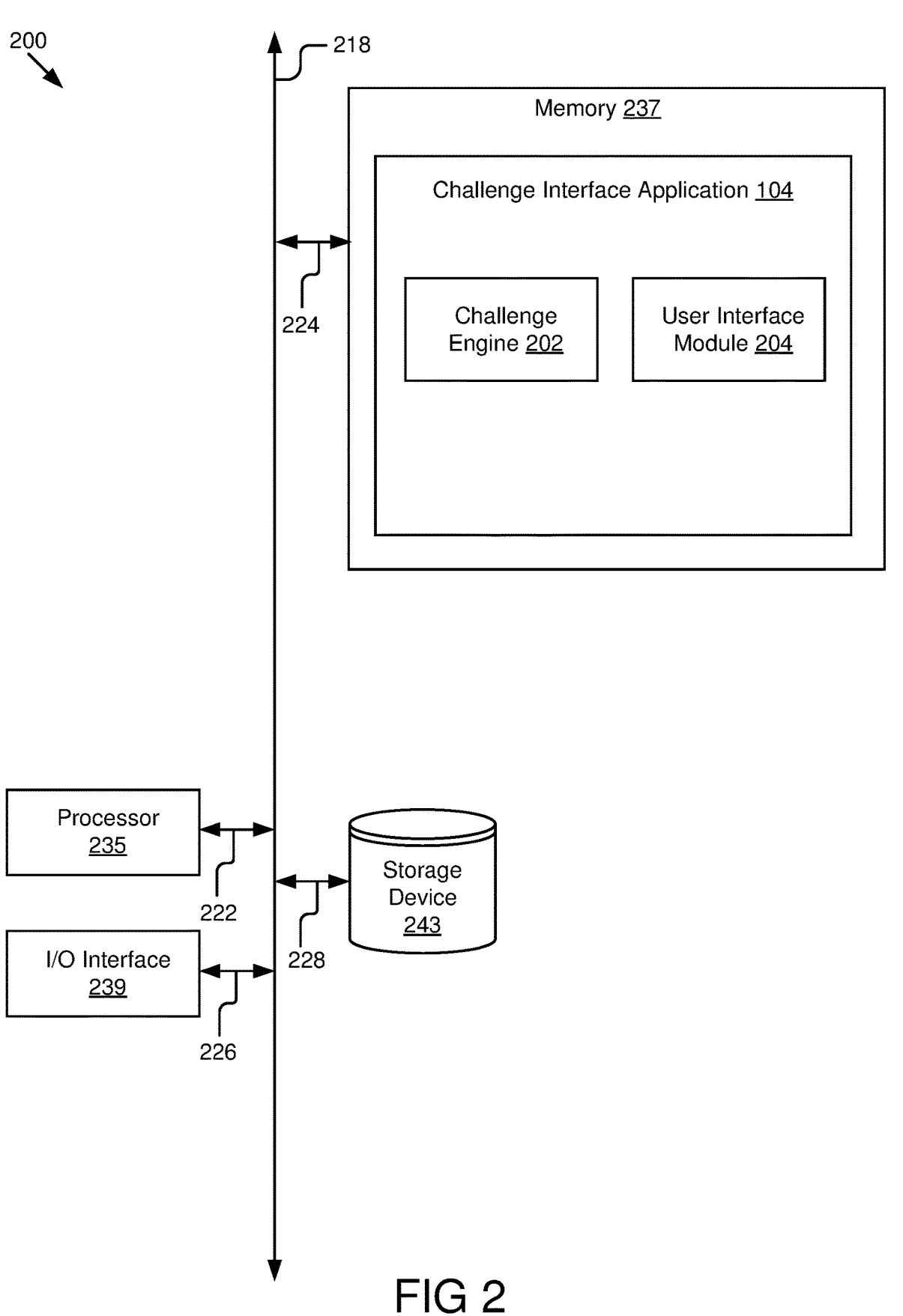
FIG. 2 is a block diagram of an example computing device to use a challenge interface to verify challenges, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server 101. In some embodiments, the computing device 200 is the user device 115.

In some embodiments, computing device 200 includes a processor 235, a memory 237, an Input/Output (I/O) interface 239, and a storage device 243. Although the challenge interface application 104 is illustrated as being the only application stored on the computing device 200, other applications may be stored on the computing device 200, such as any of the components illustrated as being part of the challenge facility 101 in FIG. 1.

The processor 235 may be coupled to a bus 218 via signal line 222, the memory 237 may be coupled to the bus 218 via signal line 224, the I/O interface 239 may be coupled to the bus 218 via signal line 226, and the storage device 243 may be coupled to the bus 218 via signal line 228.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse engine 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 243), and input/output devices can communicate via I/O interface 239. In another example, the I/O interface 239 can receive data from user device 115 and deliver the data to the challenge interface application 104 and components of the challenge interface application 104, such as the challenge engine 202. In some embodiments, the I/O interface 239 can connect to interface devices such as input devices (keyboard, pointing device, touchscreen, microphone, sensors, etc.) and/or output devices (display devices, speakers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. The storage device 243 stores data related to the challenge interface application 104. For example, the storage device 243 may store such as user IDs, challenge session IDs, challenge tokens, etc. In embodiments, the storage device 243 is the same as the database 199 in FIG. 1.

Example Challenge Interface Application 104

FIG. 2 illustrates a computing device 200 that executes an example challenge interface application 104 that includes a challenge engine 202 and a user interface module 204.

The challenge engine 202 receives, from a user device, a request to perform an action. The action may include a service (e.g., a password reset), access to a virtual experience or an action within the virtual experience (e.g., making a purchase, making a sale, removing an asset from being available for sale, etc.). In some embodiments, the challenge engine 202 receives the request from the user device to perform the action after the user has already logged-in where the log-in steps are performed by the API gateway 109 described above with reference to FIG. 1.

The challenge engine 202 determines a type of challenge or challenges to be issued based on the type of action and information associated with the request and the user device.

In some embodiments, the challenge engine 202 receives additional information from a machine-learning model that is used to determine the type of challenge. The machine-learning model may be associated with some of the components of the challenge facility 101 described with reference to FIG. 1, such as the throttling system 111 and/or the suspicious requests service 112. The trained machine-learning model receives information about a request as input and outputs a determination of suspicion. In some embodiments, the challenge engine 202 determines a number of challenges and types of challenges based on the determination of suspicion. For example, a less suspicious request may result in the challenge engine 202 implementing a captcha and a more suspicious request may result in the challenge engine 202 implementing a captcha and a two-step verification process.

The challenge engine 202 transmits a request for a challenge token to the challenge service 110 described above with reference to FIG. 1. In some embodiments, the request for the challenge token also includes a request for challenge parameters. The challenge service provides the challenge engine 202 with challenge parameters that match the type of challenge. For example, the type of challenge may include captcha, two-step verification, reauthentication, security questions, proof of work, force authenticator, etc.

The challenge engine 202 presents the challenge to the user device. In some embodiments, the user interface module 204 generates graphical data for displaying a user interface based on the type of challenge that is displayed to the user. For example, the challenge engine 202 may receive a particular captcha for the user to identify and the user interface module 204 may generate the graphical data that displays a graphic of the captcha.

The challenge engine 202 receives a response from the user that solves the challenge. In some embodiments, the challenge engine 202 provides the response to the challenge service 110 and the challenge service 110 verifies that the user device solved the challenge. In some embodiments, the challenge engine 202 determines that the user device solved the challenge and provides confirmation that the user device solved the challenge to the challenge service 110. As a result of either embodiment, the challenge engine 202 receives a challenge token from the challenge service 110. The challenge engine 202 provides the challenge token to the user device.

In some embodiments, when the user device subsequently provides a login request, the user device provides the challenge session ID and the challenge token to the authentication API and as long as the challenge session is still active, the user device can bypass the challenge requirement.

In some embodiments, the challenge engine 202 receives a change to a protocol associated with a challenge. The change may include an additional challenge or a different challenge. For example, a new protocol may include a requirement that a user has to re-enter their password before a type of action can be completed. By implementing the change to the protocol only at the challenge engine 202, the technology advantageously avoids the need to update the protocol used by the authentication API and/or the API gateway.

The user interface module 204 generates graphical data for displaying a user interface. The user interface may be used to provide user input for satisfying challenges. For example, if the challenge is for two-step verification, the user interface may include a field for inputting a code provided to the user device from another source (e.g., via SMS).

Figure 3:
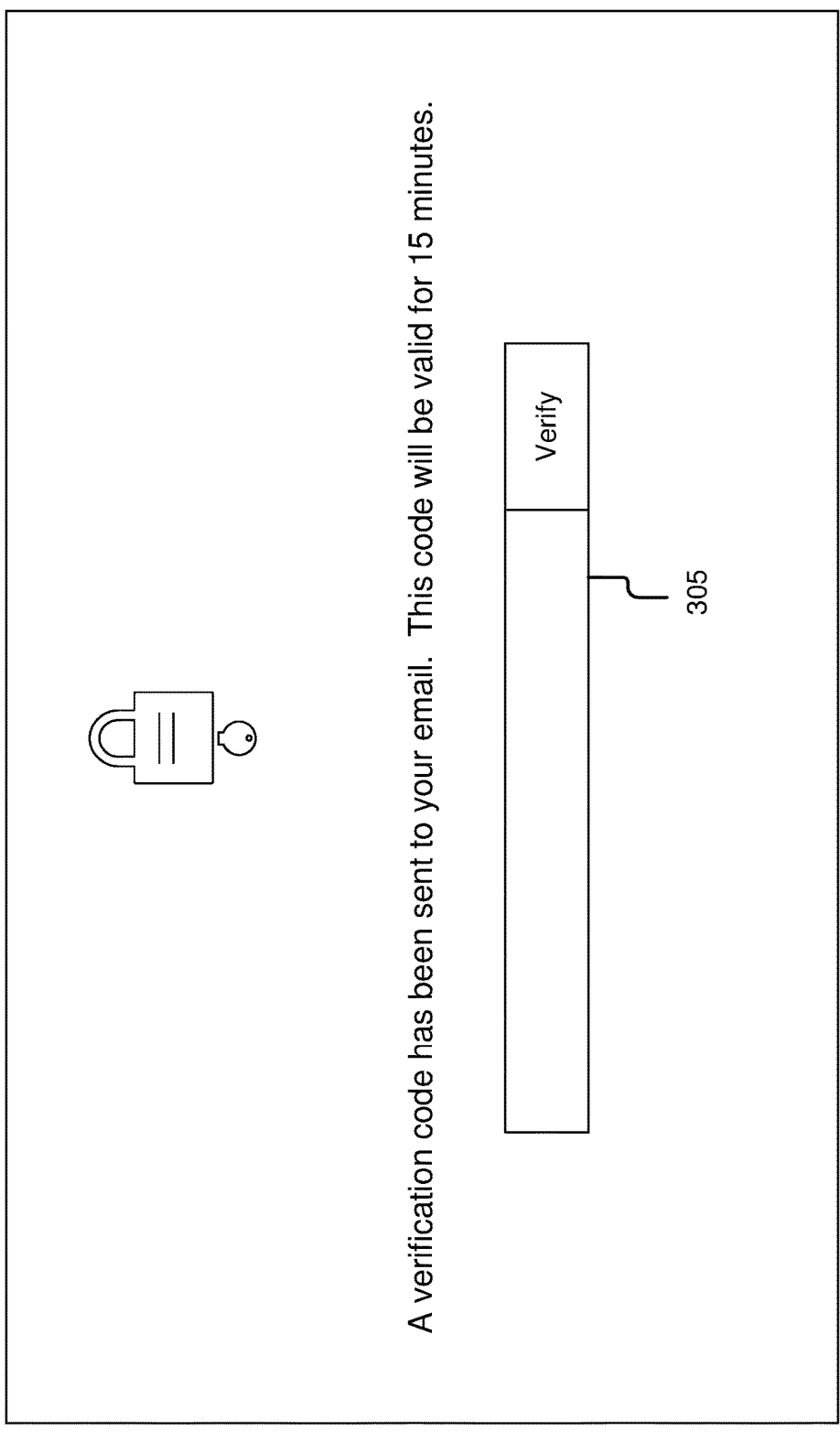
FIG. 3 is an example user interface generated by a challenge interface, according to some embodiments described herein.

FIG. 3 is an example user interface 300 generated by the user interface module 204. In this example, the user interface 300 includes a field 305 where the user can provide a code that was sent to the user via email. This is one example of a two-step verification process generated by the challenge interface application instead of the challenge service.

The user interface may also include options for selecting one or more virtual experiences. In some embodiments, the user interface includes options for modifying user preferences associated with the metaverse, such as options for configuring a user profile to include user preferences.

In some embodiments, before a user participates in the metaverse, the user interface module 204 generates a user interface that includes information about how the user's information is collected, stored, and analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

Figure 4:
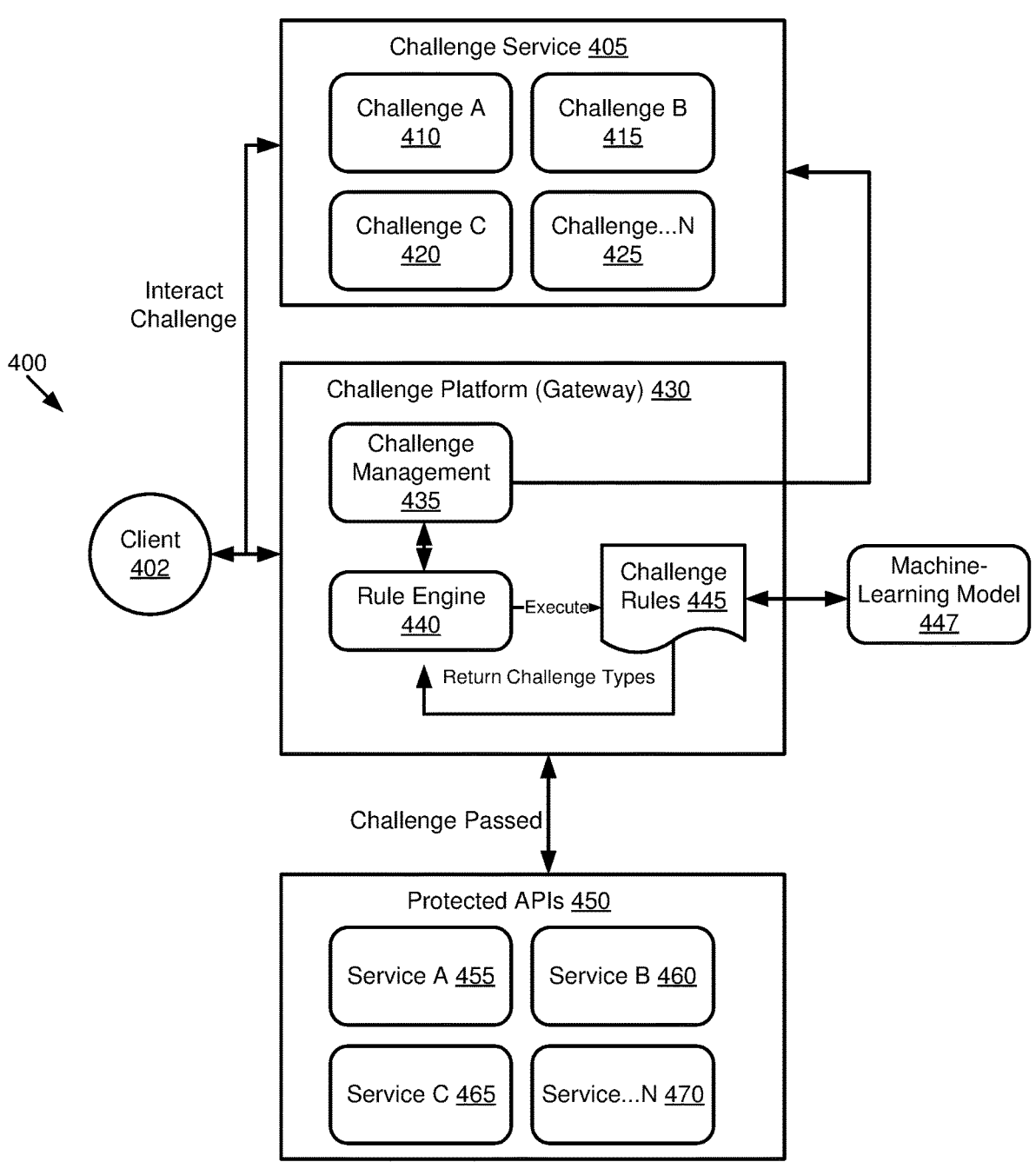
FIG. 4 is a block diagram of an example architecture to provide a challenge interface to a client before providing the client with a service, according to some embodiments described herein.

FIG. 4 is a block diagram of an example architecture 400 to provide a challenge interface to a client before providing the client with a service. The architecture 400 may include a client 402, a challenge service 405, a challenge platform (gateway) 430, and protected APIs 450. The challenge platform 430 includes challenge management 435, a rule engine 440, and challenge rules 445. The challenge service 405 includes challenge A 410, challenge B 415, challenge C 420, up to challenge N 425. The protected APIs include service A 455, service B 460, service C 465, up to service N 470.

The client 402 provides a request for service A 455 that is received by the challenge platform 430. The rule engine 440 requests challenge rules 445, which are informed by the machine-learning model 447. For example, the types of challenges may be based on a determination of suspicion output by the machine-learning model 447. The rule engine 440 dynamically decides to issue a challenge C 420 and the challenge management 435 retrieves the parameters for challenge A 410 from the challenge service 405.

The challenge interface automatically pops up challenge C to the client 402 based on the standard protocol returned from the challenge platform 430. The client 402 solves challenge C 420 in the interface mode. The request for service A 455 is automatically submitted again when challenge C is solved.

The rule engine 440 executes the challenge rule again to determine if a next challenge is needed. The rule engine 440 implements the challenge rules 445 and evaluates the signals again and decides that an additional challenge is not needed. The client 402 is able to directly finish the request for service A 455.

Example Methods

Figure 5:
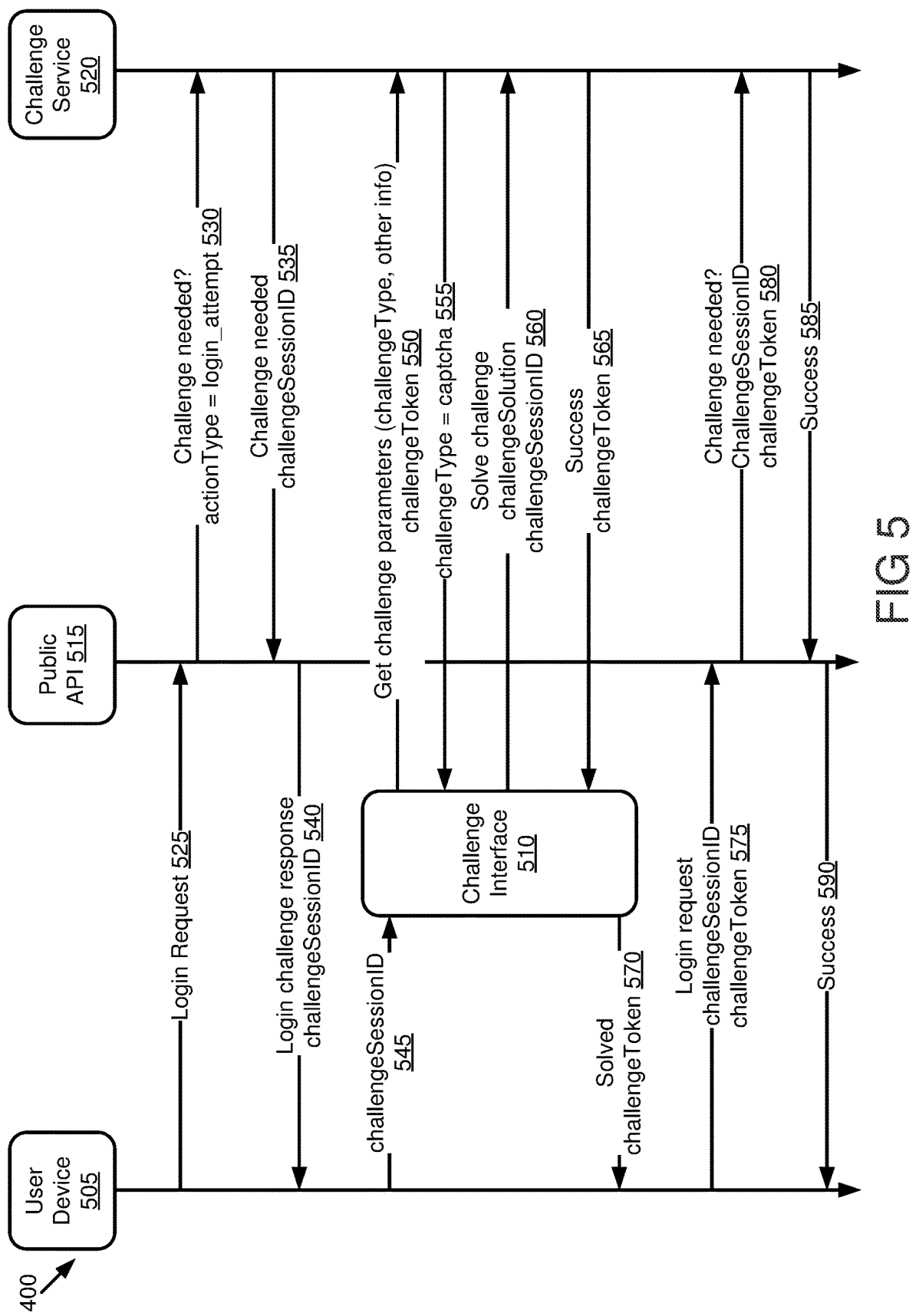
FIG. 5 is a flow diagram of an example method to provide a challenge interface that includes a user device, a challenge interface, a public application programming interface, and a challenge service, according to some embodiments described herein.

FIG. 5 is a flow diagram of an example method 500 to provide a challenge interface that includes a user device 505, a challenge interface 510, a public API 515, and a challenge service 520.

The method 500 may begin with step 525. At step 525, the user device 505 sends a login request to the public API 515.

The login request includes a valid password. The public API 515 may be the same as the API gateway 109 illustrated in FIG. 1. Step 525 may be followed by step 530.

At step 530, the public API 515 transmits a query to the challenge service 520 to determine if a challenge is needed where the type of action is a login attempt. Step 530 may be followed by step 535.

At step 535, the challenge service 520 confirms that a challenge is needed and provides a challenge session ID to the public API 515. Step 535 may be followed by step 540.

At step 540, the public API 515 transmits a login challenge response and the challenge session ID to the user device 505. Step 540 may be followed by step 545.

At step 545, the user device 505 provides the challenge session ID to the challenge interface 510. Step 545 may be followed by step 550.

At step 550, the challenge interface 510 transmits a request to the challenge service 520 for challenge parameters and a challenge token. For example, if the request is a challenge request that does not include an action type, the request may include an action identifier where the data format is a string, a challenge session ID where the data format is a string and the item is not necessary (i.e., the item is null), the request is for a challenge token where the data format is a string and the item is not necessary, and additional parameters may be included.

In another example, if the request is a challenge request that does include an action type, the request may include an action type where the data format is an enumerated type, a challenge session ID where the data format is a string and the item is not necessary (i.e., the item is null), the request is for a challenge token where the data format is a string and the item is not necessary, and additional parameters may be included. Step 550 may be followed by step 555.

At step 555, the challenge service 520 responds to the challenge interface 510 with the type of challenge to be solved. For example, the response may include whether a challenge is needed where the data format is Boolean, a challenge type where the data type is an enumerated type, a challenge session ID where the data format is a string, and challenge parameters, such as a data exchange. In this example, the type of challenge is a captcha. Step 555 may be followed by step 460.

At step 560, the challenge interface 510 transmits the solution to the captcha challenge (e.g., challengeSolution) and the challenge session ID to the challenge service 520. Step 560 may be followed by step 565.

At step 565, after validating that the challenge solution is correct, the challenge service 520 transmits a challenge token to the challenge interface 510. Step 565 may be followed by step 570.

At step 570, the challenge interface 510 provides a notification that the user device 505 solved the challenge and the challenge token to the user device 505. Step 570 may be followed by step 575.

At step 575, the user device 505 provides a subsequent login request to the public API 515 where the login request includes the password, the challenge session ID, and the challenge token. Step 575 may be followed by step 580.

At step 580, the public API 515 may transmit a query to the challenge service 520 asking if a challenge is needed along with the challenge session ID and the challenge token. Step 580 may be followed by step 585.

At step 585, the challenge service 520 transmits a notification that the authentication is successful and that an additional challenge is not needed to the public API 515. Step 585 may be followed by step 590.

At step 590, the public API 515 transmits the notification that the authentication is successful and that an additional challenge is not needed to the user device 505. As a result, the user device 505 is allowed to perform the requested action.

Figure 6:
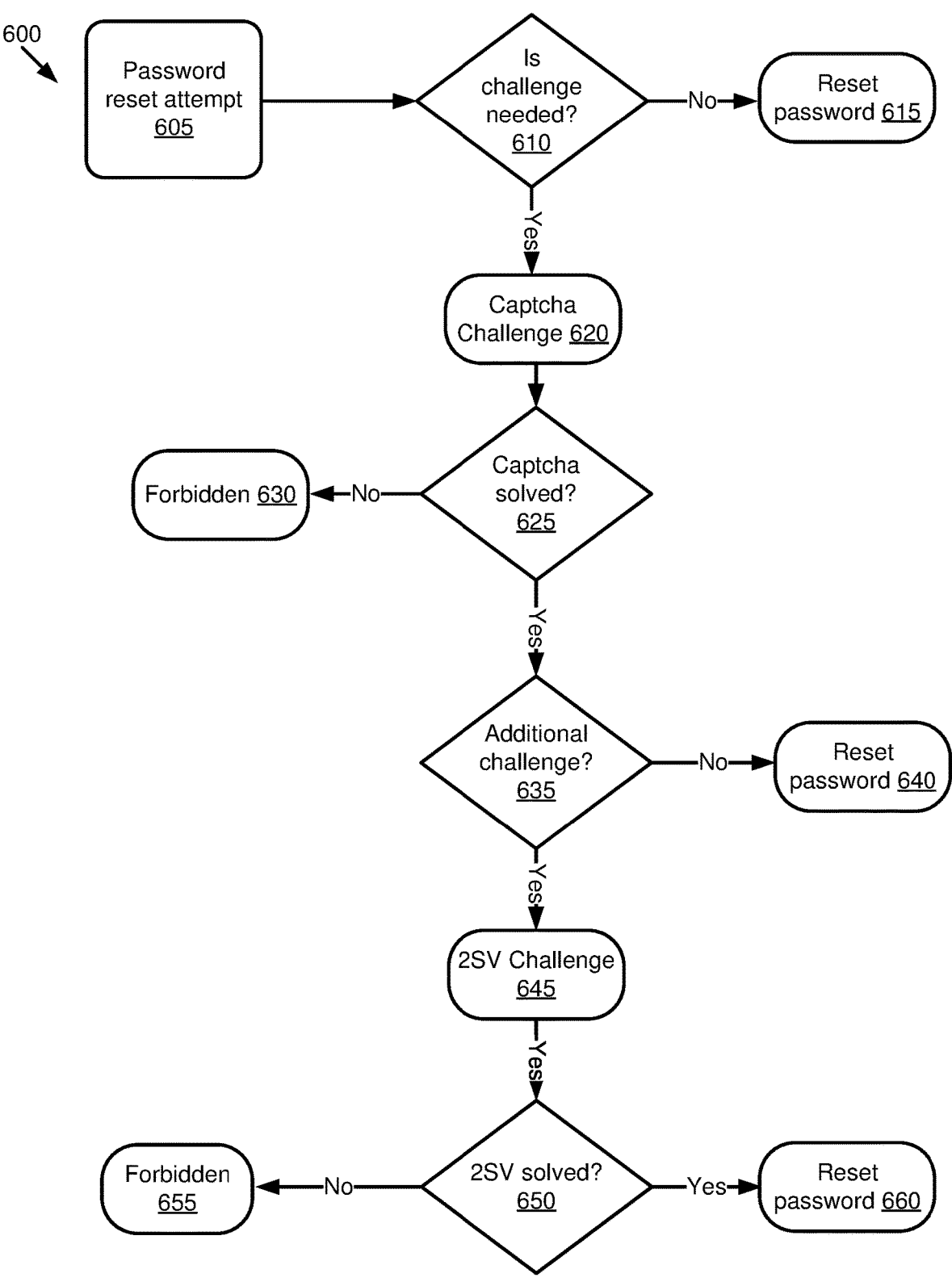
FIG. 6 is a flow diagram of an example method to provide a user with access to a virtual environment after solving different types of challenges, according to some embodiments described herein.

FIG. 6 is a flow diagram of an example method 600 to provide a user with access to a virtual environment after solving different types of challenges. In some embodiments, the method 600 is performed by the challenge interface application 104 illustrated in FIG. 1 and FIG. 2.

The method may begin at block 605. At block 605, a password reset attempt is made. Block 605 may be followed by block 610.

At block 610, it is determined whether a challenge is needed. If no captcha is needed, block 610 may be followed by block 615. At block 615, the password is reset. If a challenge is needed, block 610 may be followed by block 620.

At block 620, a captcha challenge is administered. A captcha prevents attackers from using brute force to access an account or from bot accounts being able to access the virtual environment. A captcha may be used without knowing whether the login credentials are valid. Block 620 may be followed by block 625.

At block 625, it is determined whether the captcha was solved. If the captcha was not solved, block 625 is followed by block 630. At block 630, the password reset attempt is forbidden. If the captcha was solved, block 625 may be followed by block 635.

At block 635, it is determined whether an additional challenge is needed. If no additional challenge is needed, block 635 may be followed by block 640. At block 640, the password is reset. If an additional challenge is needed, block 635 may be followed by block 645.

At block 645, two-step verification is implemented. Two-step verification prevents an attacker from accessing an account where the attacker has access to a user's password. Block 645 may be followed by block 650.

At block 650, it is determined if the two-step verification is solved. If the two-step verification is not solved, block 650 may be followed by block 655. At block 655, The password reset attempt is forbidden. If the two-step verification is solved, block 650 may be followed by block 660. At block 660, the password is reset.

FIG. 7 is a flow diagram of an example method 700 to use a challenge interface to verify a challenge. In some embodiments, the method 700 is performed by the challenge interface application 104 illustrated in FIG. 1 and FIG. 2. The method 700 may start with block 702.

At block 702, a first request to perform an action is received from a user device. In some embodiments, before the first request is received, a login request is received and the challenge device determines based on the type of action being a login request that a login challenge response is needed for authentication, where an authenticator API acts as an intermediate between the user device and the challenge service to facilitate authentication of the login request. For example, the authenticator API may serve as an intermediary layer or be a separate entity in a network that performs authentication for other entities in the network. Block 702 may be followed by block 704.

At block 704, a challenge interface transmits a second request for a challenge token to a challenge service. Block 704 may be followed by block 706.

At block 706, the challenge interface receives from the challenge service a type of challenge based on a type of action that is part of the first request. In some embodiments, the type of challenge includes at least one challenge selected from the group of captcha, two-step verification, reauthentication, security questions, proof of work, force authenticator, and combinations thereof. Block 706 may be followed by block 708.

At block 708, the challenge interface presents the type of challenge to the user device. Block 708 may be followed by block 710.

At block 710, responsive to verifying that the user device solved the type of challenge, a challenge token is received from the challenge service. In some embodiments, verifying that the user device solved the challenge includes determining whether the first request is suspicious based on information associated with the first request, the information including at least one of geographic information, a time of day, an internet protocol (IP) address, a user identifier (ID), and combinations thereof. In some embodiments, the information associated with the first request is input to a machine-learning model that outputs a determination of suspicion. In some embodiments, verifying that the user device solved the challenge includes determining whether to apply rate limiting that introduces a time delay in between authentication attempts. Block 710 may be followed by block 712.

At block 712, the challenge token is provided to the user device. In some embodiments, the method may further include receiving a change to a protocol associated with the challenge and implementing, with the challenge interface, the change to the type of challenge.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; user device+server device; etc.) and where the data analysis is performed (e.g., user device only; user device+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMS, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

receiving, from a user device, a first request to perform an action and a challenge session identifier that was provided to the user device from a challenge service based on a successful login attempt;

transmitting, from a challenge interface to the challenge service, a second request for a challenge token, wherein the second request includes the challenge session identifier;

receiving, with the challenge interface from the challenge service, a type of challenge based on the challenge session identifier and a type of action that is part of the first request, wherein the type of challenge comprises captcha, two-step verification, or reauthentication;

presenting a challenge of the type of challenge, with the challenge interface, to the user device, wherein the challenge interface is different for each type of challenge;

responsive to verifying that the user device solved the challenge, receiving the challenge token from the challenge service; and providing the challenge token to the user device, wherein responsive to receiving the challenge token, the user device provides the challenge token and the challenge session identifier to an authenticator application programming interface (API).

2. The method of claim 1, further comprising:

responsive to receiving the challenge token from the user device via the authenticator API, providing the user device with access to a virtual environment.

3. The method of claim 1, further comprising:

before receiving the first request to perform the action, receiving, with the challenge service, a login request from the user device that is forwarded from the authenticator API; and determining, with the challenge service based on the type of action being the login request, that a login challenge response is needed for authentication, wherein the authenticator API transmits a login challenge to the user device;

wherein the authenticator API acts as an intermediate between the user device and the challenge service to facilitate authentication of the login request.

4. The method of claim 1, wherein verifying that the user device solved the challenge includes determining whether the first request is suspicious based on information associated with the first request.

5. The method of claim 4, wherein the information associated with the first request is input to a machine-learning model that outputs a determination of suspicion and the machine-learning model is trained with training data that includes metadata associated with requests and determinations of whether the requests are suspicious.

6. The method of claim 1, wherein verifying that the user device solved the challenge includes determining whether to apply rate limiting that introduces a time delay in between authentication attempts.

7. The method of claim 3, further comprising:

receiving, with the challenge interface, a change to a protocol associated with the challenge; and implementing, with the challenge interface, the change to the challenge;

wherein implementing the change to the challenge with the challenge interface does not change a protocol associated with the authenticator API.

8. A system comprising:

one or more processors; and a memory coupled to the one or more processors, with instructions stored thereon that, when executed by the one or more processors, cause the one or more processors to perform operations comprising:

receiving, from a user device, a first request to perform an action and a challenge session identifier that was provided to the user device from a challenge service based on a successful login attempt;

transmitting, from a challenge interface to the challenge service, a second request for a challenge token, wherein the second request includes the challenge session identifier;

receiving, with the challenge interface from the challenge service, a type of challenge based on the challenge session identifier and a type of action that is part of the first request, wherein the type of challenge comprises captcha, two-step verification, or reauthentication;

presenting a challenge of the type of challenge, with the challenge interface, to the user device, wherein the challenge interface is different for each type of challenge;

responsive to verifying that the user device solved the challenge, receiving the challenge token from the challenge service; and providing the challenge token to the user device, wherein responsive to receiving the challenge token, the user device provides the challenge token and the challenge session identifier to an authenticator application programming interface (API).

9. The system of claim 8, wherein the operations further comprise:

receiving, with the challenge interface, a change to a protocol associated with the challenge; and implementing, with the challenge interface, the change to the challenge instead of modifying a public API used by the authenticator API.

10. The system of claim 8, wherein the operations further comprise:

responsive to receiving the challenge token from the user device via the authenticator API, providing the user device with access to a virtual environment.

11. The system of claim 8, wherein verifying that the user device solved the challenge includes determining whether the first request is suspicious based on information associated with the first request.

12. The system of claim 11, wherein the information associated with the first request is input to a machine-learning model that outputs a determination of suspicion and the machine-learning model is trained with training data that includes metadata associated with requests and determinations of whether the requests are suspicious.

13. The system of claim 11, wherein verifying that the user device solved the challenge includes determining whether to apply rate limiting that introduces a time delay in between authentication attempts.

14. The system of claim 10, wherein the operations further include:

receiving, with the challenge interface, a change to a protocol associated with the challenge; and implementing, with the challenge interface, the change to the challenge;

implementing the change to the challenge with the challenge interface does not change a protocol associated with the API.

15. A non-transitory computer-readable medium with instructions stored thereon that, when executed by one or more computers, cause the one or more computers to perform operations, the operations comprising:

receiving, from a user device, a first request to perform an action and a challenge session identifier that was provided to the user device from a challenge service based on a successful login attempt;

transmitting, from a challenge interface to the challenge service, a second request for a challenge token, wherein the second request includes the challenge session identifier;

receiving, with the challenge interface from the challenge service, a type of challenge based on the challenge session identifier and a type of action that is part of the first request, wherein the type of challenge comprises captcha, two-step verification, or reauthentication;

presenting a challenge of the type of challenge, with the challenge interface, to the user device, wherein the challenge interface is different for each type of challenge;

responsive to verifying that the user device solved the challenge, receiving the challenge token from the challenge service; and providing the challenge token to the user device, wherein responsive to receiving the challenge token, the user device provides the challenge token and the challenge session identifier to an authenticator application programming interface (API).

16. The computer-readable medium of claim 15, wherein the operations further include:

responsive to receiving the challenge token from the user device via the authenticator API, providing the user device with access to a virtual environment.

17. The computer-readable medium of claim 15, wherein the operations further include:

receiving, with the challenge interface, a change to a protocol associated with the challenge;

implementing, with the challenge interface, the change to the challenge;

before receiving the first request to perform the action, receiving, with the challenge service, a login request from the user device that is forwarded from the authenticator API; and determining, with the challenge service based on the type of action being the login request, that a login challenge response is needed for authentication, wherein the authenticator API transmits a login challenge to the user device;

wherein the authenticator API acts as an intermediate between the user device and the challenge service to facilitate authentication of the login request; and wherein implementing the change to the challenge with the challenge interface does not change a protocol associated with the API.

18. The computer-readable medium of claim 15, wherein verifying that the user device solved the challenge includes determining whether the first request is suspicious based on information associated with the first request.

19. The computer-readable medium of claim 18, wherein the information associated with the first request is input to a machine-learning model that outputs a determination of suspicion and the machine-learning model is trained with training data that includes metadata associated with requests and determinations of whether the requests are suspicious.

20. The computer-readable medium of claim 15, wherein verifying that the user device solved the challenge includes determining whether to apply rate limiting that introduces a time delay in between authentication attempts.

* * * * *